(12) United States Patent
Yang et al.

(10) Patent No.: US 12,259,181 B2
(45) Date of Patent: Mar. 25, 2025

(54) TEMPERATURE CONTROL PLATE FOR COLD-CHAIN TRANSPORTATION AND MEASUREMENT METHOD FOR TEMPERATURE CONTROL PLATE

(71) Applicant: THERO NEW MATERIAL TECHNOLOGY CO., LTD, Guangdong (CN)

(72) Inventors: Ruohan Yang, Guangdong (CN); Hanpo Huang, Guangdong (CN); Xin Nei, Guangdong (CN); Yongheng Wang, Guangdong (CN)

(73) Assignee: THERO NEW MATERIAL TECHNOLOGY CO., LTD, Shenzhen (CN)

(*) Notice: Subject to any disclaimer, the term of this patent is extended or adjusted under 35 U.S.C. 154(b) by 148 days.

(21) Appl. No.: 18/245,541

(22) PCT Filed: May 11, 2021

(86) PCT No.: PCT/CN2021/093024
§ 371 (c)(1),
(2) Date: Mar. 15, 2023

(87) PCT Pub. No.: WO2022/057280
PCT Pub. Date: Mar. 24, 2022

(65) Prior Publication Data
US 2023/0366616 A1 Nov. 16, 2023

(30) Foreign Application Priority Data
Sep. 16, 2020 (CN) .......................... 202010973410.X

(51) Int. Cl.
*F25D 29/00* (2006.01)
*F25D 3/06* (2006.01)

(52) U.S. Cl.
CPC ............ *F25D 29/003* (2013.01); *F25D 3/06* (2013.01); *F25D 2303/082* (2013.01); *F25D 2700/08* (2013.01); *F25D 2700/121* (2013.01)

(58) Field of Classification Search
None
See application file for complete search history.

(56) References Cited

U.S. PATENT DOCUMENTS 11,637,359 B2* 4/2023 Rao .................. H01Q 1/2283
                                                                    343/700 MS
2004/0238623 A1* 12/2004 Asp ................... B29C 45/14811
                                                                        235/491
(Continued)

FOREIGN PATENT DOCUMENTS

CN       104460624 A      3/2015
CN       105129237 A   * 12/2015
(Continued)

OTHER PUBLICATIONS

International Search Report in International application No. PCT/CN2021/093024, mailed on May 11, 2021.
(Continued)

*Primary Examiner* — Jianying C Atkisson
*Assistant Examiner* — Meraj A Shaikh
(74) *Attorney, Agent, or Firm* — PV IP PC; Wei Te Chung

(57) ABSTRACT

The present application discloses a temperature control plate and a Measurement method for the temperature control plate for cold-chain transportation. The temperature control plate for cold-chain transportation comprises a phase-change gel, a vacuum-sealing bag, a sealed plastic box, and an RFID passive temperature sensor tag. The phase-change gel is filled in the vacuum-sealing bag, and a supporting frame is embedded in the phase-change gel. The RFID passive temperature sensor tag is embedded in the phase-change gel. The vacuum-sealing bag is packed in the sealed plastic box, and the sealed plastic box is externally labeled with a tag identifier. The vacuum-sealing bag is a PET vacuum-sealing bag, and the sealed plastic box is a PET sealed plastic box. The Measurement method for the temperature control plate for cold-chain transportation is to detect the temperature of the temperature control plate for cold-chain transportation using a RFID reader, and the RFID reader transmits the temperature data to a data terminal. The present application solves the technical problems that the internal temperature of a temperature control plate for cold-chain transportation cannot be measured accurately, and achieves quick and effective measurement of the temperature of a phase-change material inside the temperature control plate for cold-chain transportation.

5 Claims, 1 Drawing Sheet

(56) References Cited

U.S. PATENT DOCUMENTS

2006/0199196 A1    9/2006  O'Banion
2018/0330222 A1   11/2018  Marciello et al.
2020/0242877 A1*  7/2020  Velten ........................ A61L 2/10
2023/0351140 A1* 11/2023  Koski ..................... H01Q 1/2225

FOREIGN PATENT DOCUMENTS

| CN | 206431676 U | | 8/2017 | |
|---|---|---|---|---|
| CN | 207030019 U | * | 2/2018 | |
| CN | 109682496 A | * | 4/2019 | |
| CN | 111931887 A | | 11/2020 | |
| CN | 212515867 U | | 2/2021 | |
| WO | WO-0046500 A1 | * | 8/2000 | .............. F24T 10/00 |
| WO | WO-0226024 A1 | * | 4/2002 | ............... F03G 7/04 |

OTHER PUBLICATIONS

Written Opinion of the International Search Authority in International application No. PCT/CN2021/093024, mailed on May 11, 2021.
Extended European Search Report dated Feb. 13, 2024: Appln. No. 21868118.7.
Journal of Food Engineering vol. 93 issue 4 Aug. 1, 2009 RFID smart tag for traceability and cold chain monitoring of foods: Demonstrationin an intercontinental fresh fsh logistic chain Estefania Abad etc.

* cited by examiner

TEMPERATURE CONTROL PLATE FOR COLD-CHAIN TRANSPORTATION AND MEASUREMENT METHOD FOR TEMPERATURE CONTROL PLATE

CROSS-REFERENCE TO RELATED APPLICATIONS

The present application is a U.S. national phase application of a PCT patent application No. PCT/CN2021/093024 filed on May 11, 2021, entitled "Temperature Control Plate for Cold-Chain Transportation, and Measurement Method for Temperature Control Plate", which claims priority to China Patent Application No. 202010973401.X, filed on Sep. 16, 2020, the entire contents of which are incorporated by reference in this application.

1. FIELD OF DISCLOSURE

The present application relates to the technical field of temperature control plates for cold-chain transportation, specifically, to a temperature control plate for cold-chain transportation and a Measurement method for the temperature control plate.

2. DESCRIPTION OF RELATED ART

With the development of society, the demand for temperature control in a cold-chain transportation industry has been increasing. The use of materials with the ability to maintain a constant temperature by phase changes has become an important choice for the temperature control in cold-chain systems. However, a rapid and accurate measurement of the temperature of phase change materials has become the key to a success of the temperature control. Moreover, the existing temperature control plates made of phase change materials for cold-chain transportation have different characteristics.

The temperature measurement errors of existing temperature control plates for cold-chain transportation are relatively large, resulting in an impossibility to accurately measure the temperature of temperature control plates for cold-chain transportation. There is a need to solve the problem of the inability to accurately monitor the internal temperature of the temperature control plate for cold-chain transportation, which leads to the inability to accurately detect the phase change temperature inside the phase change materials. Currently, there is no effective solution proposed for the aforementioned problem.

SUMMARY

The main purpose of this application is to provide a temperature control plate for cold-chain transportation and a method for detecting the temperature control plate to solve the problem in the prior art that the internal temperature of the temperature control plate for cold-chain transportation cannot be monitored more accurately and thus the phase change temperature inside the phase change material cannot be detected more accurately. The present invention embeds a RFID passive temperature sensor tag into an interior of the phase change gel, which is the phase change material. By using data terminals such as mobile phones or computers to control an external RFID reader, and displaying the temperature data of the RFID passive temperature sensor tag obtained by the RFID reader on the mobile phones or the computers, a faster understanding of the temperature inside the temperature control plate for cold-chain transportation can be obtained. Due to the fact that the RFID passive temperature sensor tag and the phase change gel are always together, heat transfer is more sufficient and the temperature of the RFID passive temperature sensor tag is the temperature inside the temperature control plate for cold-chain transportation. This makes practical for measuring the temperature inside the temperature control plate for cold-chain transportation more accurately. The temperature control plate for cold-chain transportation has technical effects comprising simple structure, easy promotion, and easy production, resulting in better usage effectiveness.

According to one aspect of the present application, a temperature control plate for cold-chain transportation is provided, comprising: a phase-change gel, a vacuum-sealing bag, a sealed plastic box, and an RFID passive temperature sensor tag. The phase-change gel is filled in the vacuum-sealing bag, and a supporting frame is installed inside the vacuum-sealing bag, with the supporting frame embedded in the phase-change gel. The RFID passive temperature sensor tag is embedded in the phase-change gel. The vacuum-sealing bag is placed inside the sealed plastic box, and the sealed plastic box is labeled with a tag identifier. The vacuum-sealing bag is a PET vacuum-sealing bag, and the sealed plastic box is a PET sealed plastic box. The phase-change gel is an energy storage material that fills the entire space inside the plate. It can absorb or release a large amount of energy during a phase-change process so as to maintain a relatively constant temperature. The cold-chain system utilizes this feature to keep the goods at a certain temperature range for a long time, thereby achieving the purpose of protecting the goods. At room temperature, the phase-change gel is a transparent gel with strong toughness, which can maintain its shape stability under certain stress and has no fluidity. The PET vacuum-sealing bag can enhance a barrier property against organic solvent and reduce the deformation of the gel material during freezing. In addition, since the PET vacuum-sealing bag is vacuum-sealed, it can effectively prevent condensed water vapor or bacteria in the air from entering the phase-change gel inside the temperature control plate for cold-chain transportation, and thus prevent the phase-change gel from becoming denatured. Both of the PET vacuum-sealing bag and the PET sealed plastic box are made of PET material, and PET material does not react with the phase-change gel. Other materials that may react with the gel would affect the accuracy of the data used for measurement and use. After multiple experiments, PET vacuum-sealing bag and PET sealed plastic box made of PET material were ultimately selected as a best choice. The supporting frame mainly provides support and a best choice is to use a metal supporting frame because of its good thermal conductivity and heat transfer effect, which can provide more accurate temperature data. The RFID passive temperature sensor tag is coordinated with an external RFID reader and software on a mobile phone or a computer to display temperature data.

Preferably, the joints around the left, right, front, and back sides of the sealed plastic box are sealed with sealing tape. After the sealing tape is used for seal, the packaging of the box is more tightly sealed, effectively reducing the entry of bacteria and water vapor into the interior of the box, as well as reducing the impact of bacteria and water vapor on the temperature control plate used for cold-chain transportation.

Preferably, the RFID passive temperature sensor tag is embedded in a middle portion of the phase change gel, and the tag identifier is pasted on the outer side wall of the sealed plastic box directly above the RFID passive temperature sensor tag. The tag identifier allows the user to conveniently place the RFID reader in a corresponding position for easy detection. The RFID passive temperature sensor tag has the characteristics of waterproof, flexible, and small size, making it easy to be arranged in the phase change gel.

Preferably, the vacuum-sealing bag is in close contact with the phase change gel.

Preferably, the cross-section of the sealed plastic box is one of triangle, quadrilateral, hexagon, or octagon. Ideally, a quadrilateral shape is used, that is, the overall shape of the sealed plastic box is a quad box-shaped.

Preferably, the supporting frame is a square grid formed by mutually perpendicular strip boards, and the supporting frame is a metal frame. The metal frame has good thermal conductivity, which can reduce data errors and make the detection more accurate.

To achieve the above objectives, according to another aspect of the present application, a Measurement method for a temperature control plate for cold-chain transportation is provided. The Measurement method for the temperature control plate for cold-chain transportation includes detecting the temperature inside the temperature control plate for cold-chain transportation with a RFID reader, transferring the detected temperature data to a data terminal by the RFID reader, and displaying the temperature data on a display of the data terminal. The RFID reader reads the RFID passive temperature sensor tag, and thus the temperature data measured by the RFID passive temperature sensor tag can be transferred to the RFID reader. Because the RFID reader can be worn on the wrist, it is more convenient to be used.

Preferably, the data terminal includes a tablet, a laptop, or a mobile phone. The optimal choice is a mobile phone data terminal.

In this application, a phase change gel is filled inside a vacuum-sealing bag, particularly in a PET vacuum-sealing bag. An RFID passive temperature sensor tag is embedded inside the phase change gel for more thorough heat exchange. The temperature data is then read and transmitted to the data terminal for display through an external RFID reader, making the process simple and convenient, and the obtained data more accurate. The invention solves the problem of the inability to accurately monitor the internal temperature of the temperature control plate used for cold-chain transportation and thus to accurately detect the phase change temperature inside the phase change material. The invention has a simple structure, is easy to be manufactured and promoted, and obtains more accurate temperature data for the phase change material inside the temperature control plate used for cold-chain transportation, which making it easier to use. This invention is particularly useful for transporting various materials in research institutions or transporting special equipment that requires more accurate control over the cold-chain transportation system's temperature control plate or phase change material's phase transition point. Therefore, the invention solves the above problem very well and can accurately measure temperature data, resulting in significant technological benefits.

BRIEF DESCRIPTION OF DRAWINGS

The drawings forming part of this application are provided to further illustrate and explain the features, objectives, and advantages of the present application. The illustrative embodiments and their explanations in this application are intended to explain the present application and are not intended to unduly limit the scope of the present application. In the drawings.

DETAILED DESCRIPTION OF EMBODIMENTS

To help those skilled in the art understand the present application better, the following description of the preferred embodiment in conjunction with the accompanying drawings is presented to fully illustrate the technical solution of the present application. It should be noted that the embodiments described herein are only a portion of the embodiments of the present application, and not all embodiments. Based on the embodiments disclosed in the present application, all other embodiments that those skilled in the art can obtain without inventive effort should be within the scope of protection of the present application.

It should be noted that, unless otherwise specified, the embodiments described herein and the features described in the embodiments can be combined with each other without conflict. The present application will be described in detail with reference to the accompanying drawings and in conjunction with the embodiments.

Figure 1:
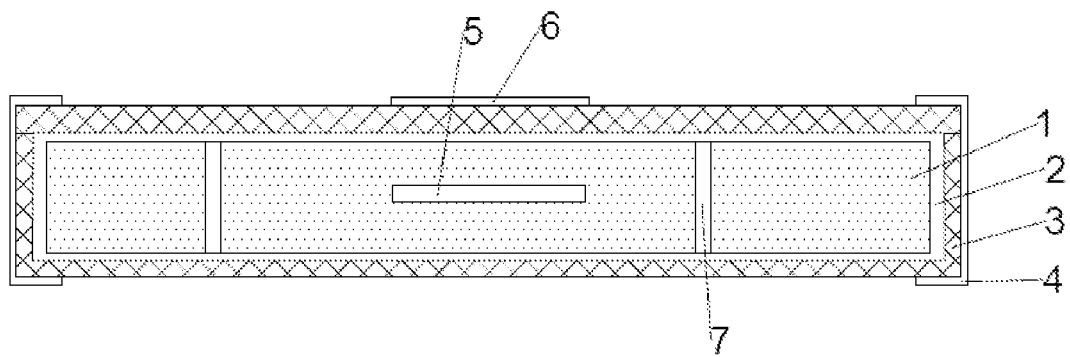
FIG. 1 is a schematic structural diagram of a temperature control plate and the same used in a Measurement method therefor for cold-chain transportation according to the present application.
Figure 2:
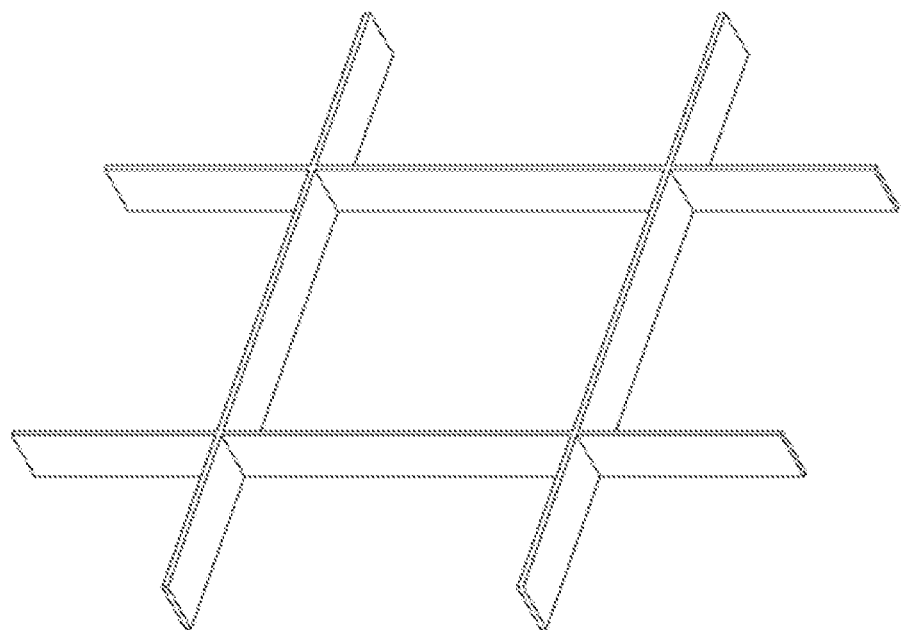
FIG. 2 is a schematic structural diagram of a supporting frame used in the temperature control plate and the same used in the Measurement method therefor for cold-chain transportation according to the present application.

The present application relates to a temperature control plate for cold-chain transportation, as shown in FIGS. 1 and 2. The temperature control plate comprises a phase change gel 1, a vacuum-sealing bag 2, a sealed plastic box 3, and an RFID passive temperature sensor tag 5. The phase change gel is filled in the vacuum-sealing bag, which is equipped with a supporting frame 7 embedded inside the phase change gel. The RFID passive temperature sensor tag is embedded in the phase change gel. The vacuum-sealing bag is placed inside the sealed plastic box, which is labeled with a tag identifier 6 on the outside thereof. The vacuum-sealing bag is made of PET material, and the sealed plastic box is made of PET material as well. The phase change gel is an energy storage material that fills the entire space inside the plate. It absorbs or releases a large amount of energy during the phase change process, while maintaining a relatively constant temperature. The cold-chain system utilizes this characteristic to maintain goods in a certain temperature range for a long period of time, thereby achieving the purpose of protecting the goods. At room temperature, the phase change gel is in a transparent gel-like liquid state, with strong toughness and the ability to maintain shape stability under certain stress, without any fluidity. The PET vacuum-sealing bag can enhance a barrier property against organic solvents and reduce deformation during freezing of the gel material. Moreover, since the PET vacuum-sealing bag is vacuum-sealed, it can effectively prevent condensed water vapor or bacteria in the air from entering the phase change gel inside the temperature control plate for cold-chain transportation, thereby preventing the phase change gel from becoming denatured. Both the PET vacuum-sealing bag and the PET sealed plastic box are made of PET material, which does not react with the phase change gel. Other materials, if reacted, would affect the accuracy of the data measurement and usage. After many experiments, the PET material was chosen to be the best for making the PET vacuum-sealing bag and the PET sealed plastic box. The supporting frame mainly provides support, and a metal supporting frame is preferred because of its good thermal conductivity and heat transfer effect, resulting in more accurate temperature data. The RFID passive temperature sensor tag will cooperate with an external RFID reader and work together with software on a mobile phone or a computer to display the temperature data.

As shown in FIG. 1, a sealing tape 4 is adhered to the joints of the left, right, front, and back sides of the sealed plastic box to enhance the sealing of the package of the box, effectively reducing the entry of bacteria and water vapor into the interior of the box, as well as minimizing the impact of bacteria and water vapor on the temperature control plate for cold-chain transportation.

As shown in FIG. 1, an RFID passive temperature sensor tag is embedded in the middle portion of the phase change gel, and the tag identifier is affixed to the outer side wall of the sealed plastic box directly above the RFID passive temperature sensor tag. The tag identifier allows users to place the RFID reader in the corresponding position for easy detection. The RFID passive temperature sensor tag has the characteristics of waterproofness, flexibility, and small size, making it easy to be arranged in the phase change gel.

As shown in FIG. 1, the inner surface of the vacuum-sealing bag is in close contact with the phase change gel.

As shown in FIG. 1, the cross-section of the sealed plastic box is a quadrilateral, that is, the overall shape of the sealed plastic box is a quad box-shaped.

As shown in FIGS. 1 and 2, the supporting frame is a square grid formed by mutually perpendicular strip boards, and the supporting frame is made of metal frame. The metal frame has good thermal conductivity, reduces data errors, and makes the detection more precise. The metal frame divides the phase change gel into nine small parts. Because the phase change material is divided into nine parts, the area of each part is reduced, and the overall deformation of the material is correspondingly reduced. Meanwhile, the high thermal conductivity of the metal frame can improve the uniformity of energy release.

This embodiment of this application also provides a Measurement method for a temperature control plate used for cold-chain transportation. The Measurement method for the temperature control plate used for cold-chain transportation comprises detecting the temperature inside the temperature control plate for cold-chain transportation using a RFID reader, transferring the temperature data inside the temperature control plate for cold-chain transportation detected by the RFID reader to a data terminal, and displaying the temperature data on a display of the data terminal. The RFID reader reads the RFID passive temperature sensor tag, which can transmit the measured temperature data to the RFID reader. Since the RFID reader can be worn on the wrist, it is more convenient to use. When the RFID reader is within 30 cm away from the temperature control plate for cold-chain transportation according to the present application, it can identify and read the temperature information.

The data terminal can be a mobile phone data terminal. Software for displaying data from the RFID passive temperature sensor tag is installed on the mobile phone data terminal to identify the data read by the RFID reader, which includes but is not limited to temperature and identification number information.

In this embodiment, a way of filling the phase change gel in a vacuum-sealing bag is employed. Particularly, the vacuum-sealing bag uses a PET vacuum-sealing bag and the RFID passive temperature sensor tag is embedded inside the phase change gel. This ensures a better heat transfer and allows for data reading via an external RFID reader. The data is then transmitted to the data terminal for display. This method is simple and convenient to use, and produces more accurate data. It solves the problem of inaccurate monitoring of the internal temperature of the temperature control plate used for cold-chain transportation and the problem of making it impossible to detect the phase change temperature inside the phase change material.

The present invention has the advantages of a simple structure, easy manufacturing and promotion, and more accurate temperature data measurement of the phase change material inside the temperature control plate for cold-chain transportation. This is particularly useful for transporting various materials in scientific research institutions or transporting special equipment that requires more precise temperature control. Therefore, the present invention solves the aforementioned problems and can accurately measure temperature data, thus having a significant technical effect.

The above description is merely a preferred embodiment of the present application and is not intended to limit the scope of the present application. Various modifications and changes may be made by those skilled in the art within the spirit and principles of the present application. Any modifications, equivalent substitutions, improvements, etc., made within the spirit and principles of the present application should be included within the scope of the present application.

What is claimed is:

1. A temperature control plate for cold-chain transportation, comprising a phase change gel (1), a vacuum-sealing bag (2), a sealed plastic box (3), and an RFID passive temperature sensor tag (5), wherein the phase change gel (1) is filled inside the vacuum-sealing bag (2) with a supporting frame (7) embedded within the phase change gel, an inner surface of the vacuum-sealing bag is in close contact with the phase change gel, and an inner space of the vacuum-sealing bag which is formed by the inner surface is a vacuum state; the RFID passive temperature sensor tag (5) is embedded inside a location of the phase change gel which is different from a location of the supporting frame, the vacuum-sealing bag (2) is placed inside the sealed plastic box (3), and a tag identifier (6) is attached to the outside of the sealed plastic box, the vacuum-sealing bag (2) is made of PET material, and the sealed plastic box (3) is made of PET plastic.

2. The temperature control plate for cold-chain transportation according to claim 1, wherein a sealing tape is attached around joints of the sealed plastic box for sealing.

3. The temperature control plate for cold-chain transportation according to claim 1, wherein the RFID passive temperature sensor tag is embedded in a middle portion of the phase change gel, and the tag identifier is attached to an outside wall of the sealed plastic box at a position directly above the RFID passive temperature sensor tag.

4. The temperature control plate for cold-chain transportation according to claim 1, wherein the cross-section of the sealed plastic box is one of a triangle, a quadrilateral, a hexagon, or an octagon.

5. The temperature control plate for cold-chain transportation according to claim 1, wherein the supporting frame is a square grid formed by mutually perpendicular strip plates and the supporting frame is a metal frame.

* * * * *